United States Patent [19]

Guichard et al.

[11] Patent Number: 4,933,762

[45] Date of Patent: Jun. 12, 1990

[54] METHOD AND CODING AND DECODING DEVICES FOR PICTURE TRANSMISSION THROUGH A VARIABLE RATE NETWORK

[75] Inventors: Jacques Guichard, Paris; Gërard Eude, Torcy, both of France

[73] Assignee: Etat Francais Rpresente Par Le Ministre Des Postes, Telecommunications Et De L'Espace (Centre National d'Etudes des Telecommunications), Issy-Les-Moulineaux, France

[21] Appl. No.: 278,573

[22] Filed: Nov. 28, 1988

[30] Foreign Application Priority Data

Dec. 16, 1987 [FR] France ................................. 87-17577

[51] Int. Cl.$^5$ ............................................. H04N 7/12
[52] U.S. Cl. ..................................... 358/133; 358/136; 375/26; 375/27
[58] Field of Search ............... 358/133, 135, 136, 137, 358/138; 375/27, 38, 26

[56] References Cited

U.S. PATENT DOCUMENTS

| | | | |
|---|---|---|---|
| 4,513,426 | 4/1985 | Jayant | 375/27 |
| 4,837,617 | 6/1989 | Brusewitz | 358/133 |

OTHER PUBLICATIONS

J. Guichard and D. Nasse, "L'image Numerique et le Codage" (Coding and the Digital Picture) L'Echo Des Recherches, No. 126, Fourth Quarter, 1986, pp. 21-36.

*Primary Examiner*—John W. Shepperd
*Assistant Examiner*—Michael D. Parker
*Attorney, Agent, or Firm*—Lowe, Price, LeBlanc, Becker & Shur

[57] ABSTRACT

The coding and decoding devices embodying the invention are connected by two paths, a main path and an auxiliary path, of a variable rate digital transmission network. When the main path is capable of dispatching the totality of the information rate that the coding device is able to issue, only a main coder and a main decoder, respectively of the coding and decoding devices, are active. When the main path is not capable of dispatching the totality of the picture information, an auxiliary coder and an auxiliary decoder, respectively of the coding and decoding devices, are also active and the auxiliary path dispatches the part of the information rate that cannot be dispatched by the main path. A decoder and a subtracter are provided in the coding device so as to estimate the part of information not transmitted by the main path.

10 Claims, 3 Drawing Sheets

METHOD AND CODING AND DECODING DEVICES FOR PICTURE TRANSMISSION THROUGH A VARIABLE RATE NETWORK

BACKGROUND OF THE INVENTION

1 - Field of the invention

The present invention relates to picture transmission in general, and particularly to animated pictures such as television pictures. More specifically, the invention is concerned with a method of decreased rate picture coding and increased rate picture decoding, so as to transmit a digital signal of animated pictures through a variable :ate digital network such as an asynchronous digital network.

2 - Description of the Prior Art

In the article entitled "L'image numérique et le codage". (Coding and the digital picture) published, i.e. parenthesis in "L'écho des recherches", No. 126, fourth quarter 1986, pages 21 to 36, J. GUICHARD and D. NASSE describe the state of the art in the field of digital picture processing for decreased rate picture transmission. The different coding and decoding devices in existence are designed for picture transmission through constant rate transmission paths, such as those going through an integrated services digital network (ISDN). The coding device is usually equipped with a buffer memory of adequate capacitance at output so as to match the coded picture rate with the constant rate of the transmission paths allocated to the network. This buffer memory introduces a dead time in picture transmission between the transmission equipment and reception equipment situated at different extremities of the network and including respectively a coding device and a decoding device. This dead time in picture transmission is particularly inconvenient, e.g. in the case of interactive picture services such as very low rate telephony (64 kbit/s). The advantage of a variable rate network is that in providing the possibility of transmitting a variable information rate, it enables the capacitance of the buffer memory to be reduced or ever suppressed, thus reducing dead time in transmission between the coding device and the decoding device. Nevertheless, the traffic dispatch capacity of variable rate networks, such as asynchronous networks, is statistically calculated. The fact that all subscribers do not simultaneously use the maximum rate allocated to them is taken into account, and the network is designed to dispatch a statistically determined average total rate. As a result of this, a subscriber can find himself temporarily denied an increase in rate in the event of the network being overloaded and the requested rate being greater than a minimum guaranteed rate. The additional information resulting from the requested increase in rate is not routed to its final destination in this case. In the case of coded picture transmission, the non-routing of the requested additional information is particularly catastrophic since the coding and decoding algorithms are of the recursive type. It is necessary that information that has been processed by the coding device arrive at destination in the decoding device.

OBJECT OF THE INVENTION

The object of this invention is to provide a coding and decoding method for decreased rate picture transmission, without loss of information, through a variable rate digital network.

SUMMARY OF THE INVENTION

According to one aspect of the invention, a method of coding and decoding a digital signal including picture information, comprises:

coding and rate decreasing an incoming digital video signal including picture information into a first coded digital signal having a variable rate at most equal to a maximal information rate and less than the rate of said incoming digital signal, transmitting said first coded digital signal in a first variable-rate transmission path of a digital transmission network, said rate decrease being a function of an instantaneous information rate dispatched by said first patch, producing additional picture information in response to said instantaneous information rate in said first path being lower than said maximal information rate, said additional picture information being substantially deduced from a difference in picture information between said incoming digital signal and said first coded signal, coding said additional picture information into a second coded digital signal, transmitting said second coded digital signal in a second variable-rate transmission path of said network, decoding and rate increasing said first coded digital signal in said first path as a function of said instantaneous rate of said first path, thereby deriving a first decoded signal, decoding said second coded signal in said second path into a second decoded signal, and adding said first and second decoded signals into a recovered digital video signal substantially analogous to said incoming digital video signal.

According to another aspect of the invention, a coding device for an incoming digital video signal including picture information comprises:

first coding means for coding said incoming digital video signal into a first coded digital signal having a variable rate at most equal to a maximal information rate and less than the rate of said incoming digital signal, thereby transmitting said first coded digital signal in a first variable-rate transmission path of a digital transmission network, said first coded signal undergoing with respect of said incoming signal a rate decrease that is a function of an instantaneous information rate dispatched by said first path, means for estimating picture information included in said incoming digital video signal and effectively carried by said first coded signal thereby producing an estimated digital video signal, means responsive to said instantaneous information rate in said first path being lower than said maximal information rate for subtracting said estimated digital video signal from said incoming digital video signal into a digital video signal representative of additional picture information, second means for coding said additional picture information video signal into a second coded digital signal thereby transmitting said second coded signal in a second variable-rate transmission path of said network.

A decoding device implementing the method embodying the invention wherein it comprises first means complementing the first coding means and the evaluating means included in the coding device for decoding the first coded digital signal received into a first decoded digital video signal analogous to the evaluated signal, second means complementing the second coding means included in the coding device for decoding the second coded digital signal received into a second decoded digital video signal analogous to the digital video error signal, and means for adding up the first and second digital video signals so as to produce the reinserted digital video signal.

BRIEF DESCRIPTION OF THE DRAWING

The foregoing and other objects, features and advantages of the invention will be apparent from the following detailed description of several preferred embodiments of the invention with reference to the corresponding accompanying drawings in which.

DESCRIPTION OF THE PREFERRED EMBODIMENTS

The state of the art in the field of digital coding is referred to in the following paragraphs on the description of the coding and decoding devices embodying the invention. The above-mentioned article by J. GUICHARD and D. NASSE is useful with regard to additional information particularly concerning the movement compensating technique and the use of transforms in the field of reduced rate digital picture transmission.

Figure 1:
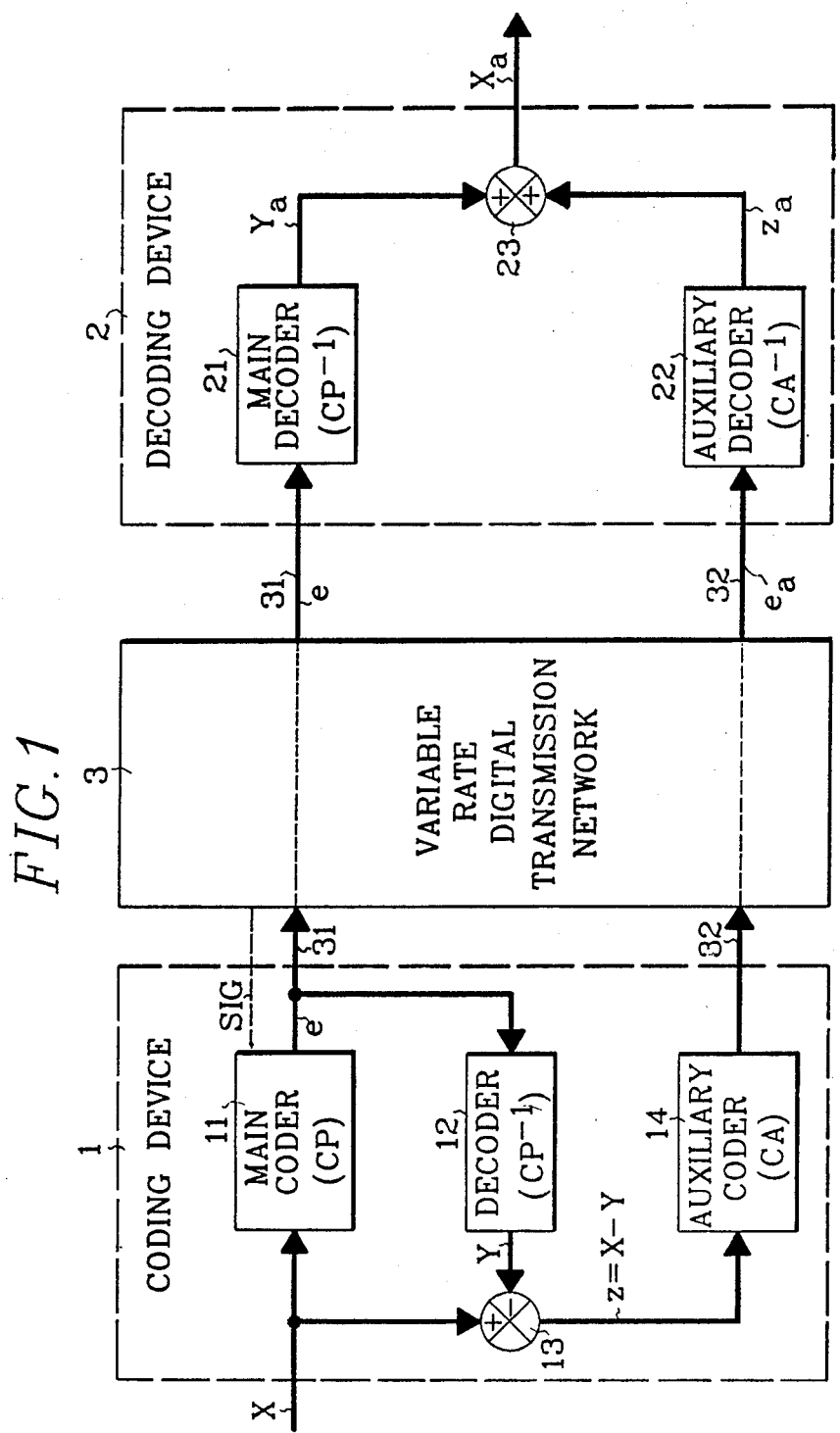
FIG. 1 is a schematic block diagram of a coding and decoding system comprising a coding device and a decoding device embodying the invention connected through a variable rate digital transmission network.

As illustrated in FIG. 1, a coding device 1 and a decoding device 2 embodying the invention are connected through a variable rate digital transmission network 3 such as an asynchronous digital packet transmission network.

The coding device 1 comprises a main coder 11 embodying a coding function CP, a decoder 12 embodying a decoding function $CP^{-1}$ inverse of the coding function CP, a subtracter 13 and an auxiliary coder 14 embodying a coding function CA.

The main coder 11 is preferably a well known coder of the predicting loop type. At input, the coder 11 receives a digital video signal X comprised of digital sample words resulting from the sampling of a constant frequency luminance or chrominance signal. At output, the coder 11 issues an outgoing quantized and coded digital error signal e which is transmitted to the decoding device 2 through a first variable rate transmission path 31 of the network 3. The error signal e represents the difference between the signal X and a predicting signal produced in the coder 11 according to previous values of the signal X. The error signal e is also supplied at input of the decoder 12 which issues at output an estimated digital video signal Y. The estimated signal Y is applied to an inverse input "-" of the subtracter 13. A direct input "+" of the subtracter 13 receives the signal X. The subtracter 13 supplies at output a digital error signal z representing the difference between signals X and Y. The signal z is applied at input of the auxiliary coder 14 which quantizes it and codes it into a corresponding quantized and coded digital error signal $e_a$. The signal $e_a$ is transmitted to the decoding device 2 through a second variable rate transmission path 32 of network 3.

The structure of the auxiliary coder 14 is preferably complementary to the main coder 11, while embodying a coding function of the same family as that of the main coder 11. Unlike the main coder 11, the coder 14 needs not be a predicting loop coder and embodies a coding function e.g. of PCM or DPCM (differential PCM coding) type, whereas the main coder embodies a coding function of e.g. discrete cosine transform type, or inversely.

When the network 3 is capable of dispatching through path 31 the totality of the information rate that the main coder 11 is capable of supplying, the coder 11 functions in a maximal resolution mode, and the estimated signal Y representing an evaluation of the information contained in the video signal X effectively transmitted by the coded signal e through the path 31 is quite similar to the signal X. The error signal $z=X-Y$ is then in the region of zero. The auxiliary coder 14 is inactive and no picture information has been dispatched through the path 32. When the network 3 is not capable of dispatching through path 31 the totality of the information rate that could be supplied by the main coder 11, e.g. because of overloading of the network 3, the coder 11 puts itself in a reduced resolution functioning mode, e.g. by increasing the quantization intervals of the signal X and thus reducing the number of quantization levels of the signal X, and the estimated signal Y becomes substantially different to the signal X. The error signal $z=X-Y$ has then a non-zero value representing additional precision concerning the signal X and not transmitted through the path 31. The auxiliary coder 14 is active and issues a non-zero signal $e_a$ along the path 32. Additional information concerning the signal X is thus transmitted through the path 32 in order that the decoding device 2 be capable of recuperating the signal X with the required precision. In practice, it should be noted that a buffer memory circuit included in the main coder 11 receives a signaling mark SIG from the central switching system of the subscriber's cable in the network 3 thereby indicating the instantaneous rate that can be dispatched along the path 31.

The decoding device 2 comprises a main decoder 21 embodying the decoding function $CP^{-1}$ inverse of the coding function CP embodied by the coder 11, and a summing integrator 23.

The decoders 21 and 22 receive respectively at input the signals e and $e_a$ transmitted along paths 31 and 32. The decoders 21 and 22 respectively reconstitute the signals $Y_a$ and $z_a$ from the signals e and $e_a$ received. The signals $Y_a$ and $z_a$ are respectively applied to first and second inputs of the summing integrator 23. The summing integrator 23 supplies at an output thereof a recovered digital video signal $X_a$ corresponding to the signal X.

The block diagram of the coding device embodying the described invention as illustrated in FIG. 1 is a skeleton block diagram in which the main coder 11 and the decoder 12 are shown in the form of separate functional elements. In fact, in well known coders of the predicting type, the decoder is included in the predicting loop of the coder, thereby enabling the signal Y to be taken directly at a given hook-up point of the main coder 11. The complexity of a coding device embodying the invention is substantially reduced as a result of this characteristic.

Figure 2:
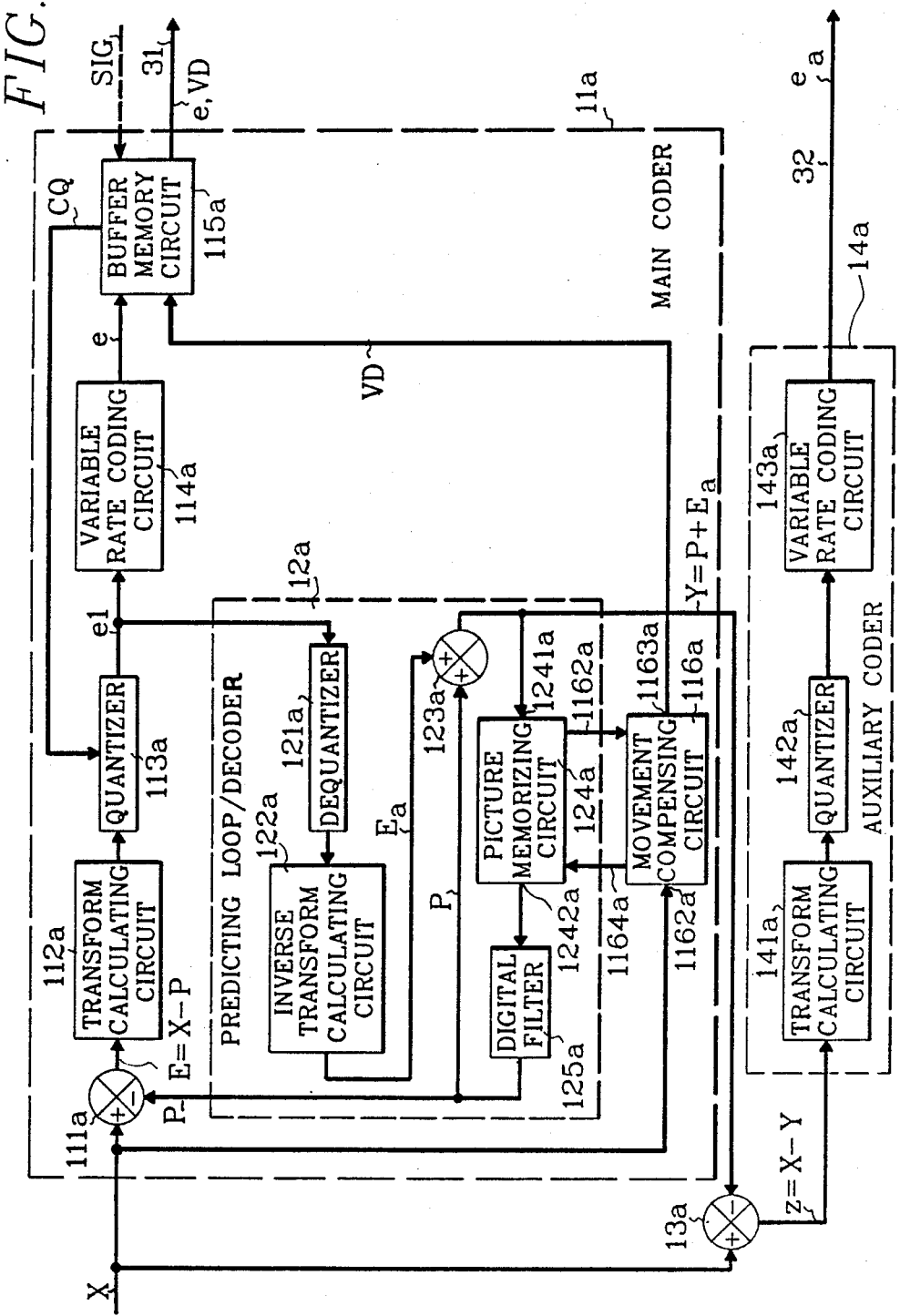
FIG. 2 is a detailed block diagram of a first preferred embodiment of a coding device embodying the invention.

As illustrated in FIG. 2, a first preferred embodiment of the coding device 1 embodying the invention comprises a main coder 11a with a predicting loop constituting a decoder 12a, a subtracter 13a and an auxiliary coder 14a.

The main coder 11a is a transform, predicting loop and movement compensation type coder. It comprises a subtracter 111a, a transform calculating circuit 112a, a quantizer with adjustable quantization levels 113a, a variable rate coding circuit 114a, a buffer memory circuit 115a, a predicting loop/decoder 12a, and a movement compensating circuit 116a.

The subtracter 111a receives the incoming digital video signal X at a direct input "+", and at an inverse input "−" a digital signal P resulting from a predicting of the value of the signal X, and supplies a digital error signal E=X-P. The signal E is applied at input of the transform calculating circuit 112a which operates a reversible transformation on the signal E, e.g. a discrete cosine transformation, so as to represent the signal E in a space other than the representing space of signal X, enabling a better decorrelation between the different points of the picture. The signal E is supplied after transformation to the quantizer 113a which produces a transformed and quantized digital error signal e1 corresponding to the signal E. The quantization levels in the quantizer 113a are adjusted by a control signal CQ supplied by the buffer memory circuit 115a at a level adjusting input of the quantizer 113a. The signal e1 is supplied at input of the variable rate coding circuit 114a and at input of a dequantizer 121a included in the predicting loop/decoder 12a. The variable rate coding circuit 114a codes each digital sample of the signal e1 into a corresponding digital word with a bit number depending on the value of the sample. The circuit 114a embodies a rate reduction by optimizing the bit number required for the representation of each sample to a minimal value. The circuit 114a supplies the quantized and coded digital error signal e. The signal e is applied to a first input of the buffer memory circuit 115a. A second input of the buffer memory circuit 115a receives a digital signal VD bearing digital words representative of picture block displacement vectors. The samples and digital words of signals e and VD are loaded in the buffer memory circuit 115a and transmitted along the path 31 of the network 3 (FIG. 1) in chronological order of arrival. The buffer memory circuit 115a comprises a buffer memory, which is analogous to a buffer memory included in a conventional constant rate transmission network coder, but which has a much lower capacitance. The function of the circuit 115a is to produce a rate match between the rate of signal e and the instantaneous rate of the path 31 signalled by the central switching system of the subscriber's cable, these rates corresponding to the buffer memory's writing and reading clocks. The buffer memory 115a controls the adjustment of the quantization levels in the quantizer 113a according to its load level, by means of the control signal CQ. The number of quantization levels in the quantizer 113a is all the lower that the number of cells in use in the buffer memory 115a is high, i.e. the instantaneous rate along path 32 is lower than the rate of signal e.

The predicting loop/decoder 12a comprises, as well as the dequantizer 121a, an inverse transform calculating circuit 122a, a summing integrator 123a, a picture memorizing circuit 124a and a digital filter 125a.

The dequantizer 121a and the inverse transform calculating circuit 122a are laid out in cascade so as to reconstruct from the transformed and quantized error signal e1, a corresponding digital error signal Ea represented in the same space as the signal X and having a rate equal to that of the signal X. The signal Ea is applied to a first input of the summing integrator 123a. A second input of the summing integrator 123a receives the predicting signal P. An output of the summing integrator 123 produces the estimated digital video signal Y=P+Ea. The signal Y is applied to an input 1241a of the picture memorizing circuit 124a and at an inverse input "−" of the subtracter 13a receiving the incoming signal X at a direct input "+". The picture memorizing circuit 124a comprises a picture memory that memorizes the previous value of the signal Y for a same picture element, this value being processed by the movement compensating circuit 116a and taking part in the predicting of the value of the signal X for said picture element. The predicting signal P has a rate equal to that of the signal X and is applied by an output 1242a of the picture memorizing circuit 124a, through the filter 125a, to the second input of the summing integrator 123a and to the inverse input of the subtracter 111a.

The movement compensating circuit 116a comprises a central processing unit, e.g. made up of a microprocessor, which processes according to a microprogram the different values of the estimated signal Y memorized in the picture memorizing circuit 124a and the different values of the signal X so as to calculate the blocks displacement vectors respectively for a multiplicity of predetermined picture blocks. Each vector represents a block displacement corresponding to an incoming picture carried by the signal X by comparison with the position of this same block in the previous picture. Such an interpicture prediction can if necessary be combined with infrapicture prediction between blocks of same picture. The movement compensating circuit 116a receives the incoming video signal X at an input 1161a and memorized values of the signal Y read in the picture memory at an input 1162a. The digital words VD representative of the displacement vectors are issued by an output 1163a of the circuit 116a. According to the calculated displacement vectors, the movement compensating circuit 116a modifies if necessary the values of the signal Y memorized in the buffer memory of the circuit 124a so as to improve the prediction of the signal X. A connection 1164a between the movement compensating circuit 116a and the picture memorizing circuit 124a is provided so as to write the modified values of the signal Y into the picture memory.

The auxiliary coder 14a does not comprise a predicting loop. It comprises a transform calculating circuit 141a, a quantizer 142a, and a variable rate coding circuit 143a. The circuit 141a, the quantizer 142a and the circuit 143a are laid out in cascade so as to produce from the digital error signal z=X-Y supplied by the subtracter 13a, the digital error signal $e_a$ transmitted along the path 32. The transform calculating circuit 141a receives the signal z at input; the variable rate coding circuit 143a supplies the signal $e_a$ at output; the quantizer 142a is located between the circuits 141a and 143a. The circuits 141a and 143a are analogous to the circuits 112a and 114a of the main coder 11a. Unlike the quantizer 113a of the main coder 11a, the quantizer 142a has fixed quantization levels. The variable rate coding circuit 143a supplies an information rate that varies without exceeding nevertheless a minimum rate guaranteed along the path 32 by the variable rate network 3.

The detailed structure of the decoding device 2 matched to the decoding device as illustrated in FIG. 2 can easily be deducted by those skilled in the art from the general structure of the decoding device 2 described in reference to FIG. 1. The main decoder comprises a buffer memory circuit followed by a decoding circuit that complements the variable rate coding circuit 114a shown in FIG. 2 and by a predicting loop such as the predicting loop/decoder 12a, shown in FIG. 2. A movement compensating circuit receiving the digital words VD taken from the buffer memory of the main decoder and processing the values memorized and read in the picture memory of the predicting loop according to the words VD received, must also be provided in the main decoder. The auxiliary decoder comprises a decoding circuit that complements the variable rate coding circuit 143a shown in FIG. 2, followed by a dequantizer and by an inverse transform calculating circuit.

Figure 3:
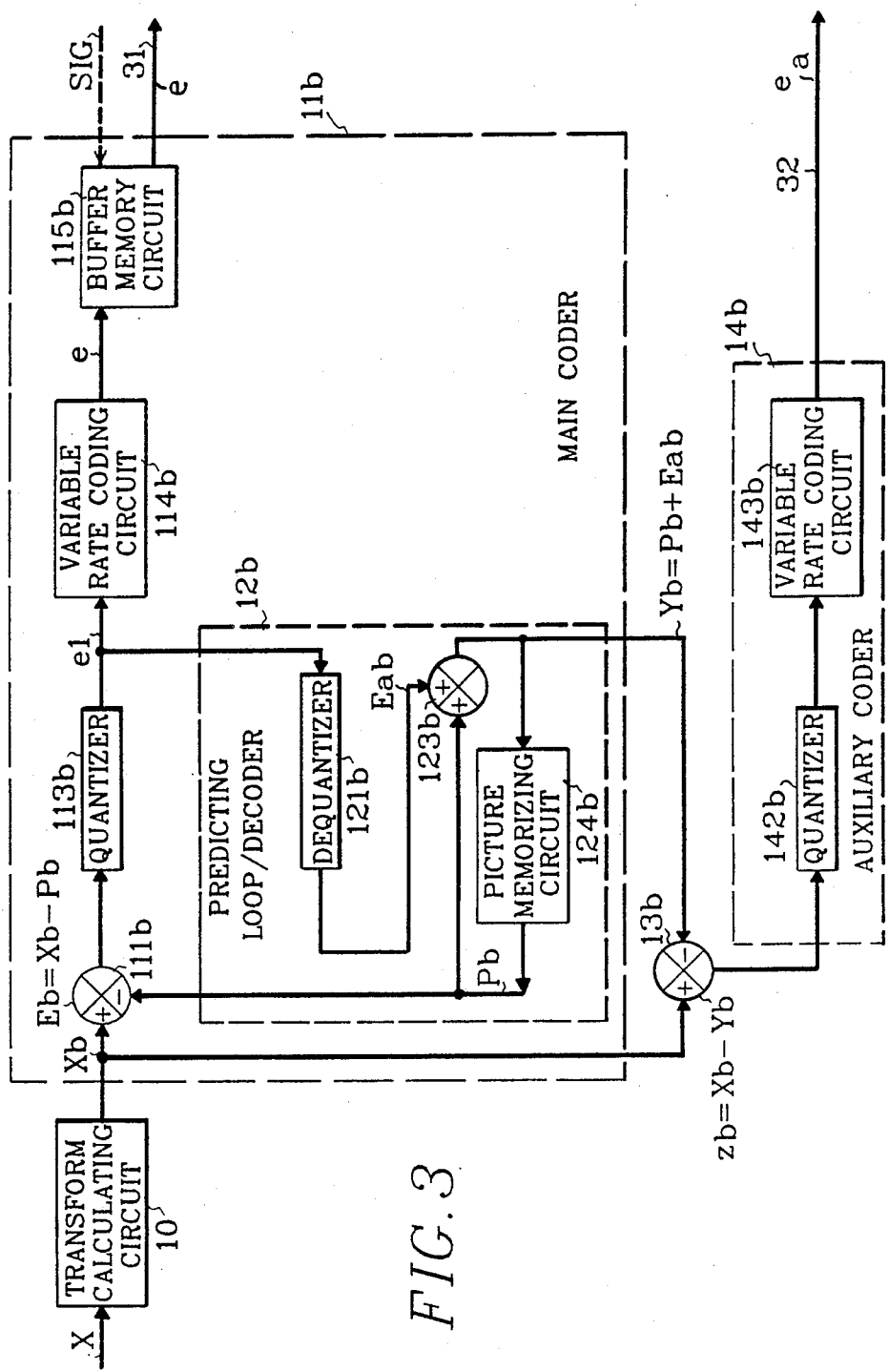
FIG. 3 is a detailed block diagram of a second preferred embodiment of a coding device embodying the invention.

As illustrated in FIG. 3, a second preferred embodiment of simplified structure of a coding device 1 embodying the invention comprises a transform calculating circuit 10 located at input of a main coder 11b of the transform and predicting loop type and which includes a predicting loop/decoder 12b, a subtracter 13b and an auxiliary coder 14b.

The main coder 11b and the auxiliary coder 14b have simpler structures than those of the coders 11a and 14a shown in FIG. 2 since the main coder 11b does not compensate movement.

The main coder 11b comprises, as well as the predicting loop/decoder 12b, a subtracter 111b, a quantizer 113b, a variable rate coding circuit 114b and a buffer memory circuit 115b, a summing integrator 123b and a picture memorizing circuit 124b.

Unlike the coder 11a shown in FIG. 2, where the transform calculating circuit 112a is located at output of the subtracter 111a, the transform calculating circuit 10 is connected to the direct input "+" of the subtracter 111b and receives at input the incoming digital video signal X to produce a transformed digital video signal Xb at output. The subtracter 111b receives the transformed signal Xb at the direct input "+" and a digital predicting signal Pb at the inverse input "−". The signal Pb results from a prediction of the transformed signal Xb. The subtracter 111b applies a transformed digital error signal Eb=Xb−Pb at input of the quantizer 113b. The quantizer 113b has fixed quantization levels; it issues at output the transformed and quantized digital error signal e1 corresponding to the signal Eb. The signal e1 is applied at input of the variable rate coding circuit 114b and of the dequantizer 121b included in the predicting loop/decoder 12b. The circuit 114b is analogous to the variable rate coding circuit 114a shown in FIG. 2; it issues at output the digital error signal e corresponding to the signal e1 and transmitted along the first path 31 of the network 3 through the buffer memory circuit 115b.

In the predicting loop/decoder 12b, the dequantizer 121b receives at input the signal e1 and produces at output a transformed digital error signal Eab reconstructed from the signal e1. The summing integrator 123b receives at first and second inputs the signals Eab and Pb respectively, and issues at output an estimated digital video signal Yb=Pb+Eab. The signal Yb is supplied at input of the picture memorizing circuit 124b and at the inverse input "−" of the subtracter 13b whose direct input "+" receives the signal Xb. The picture memorizing circuit 124b supplies the predicting signal Pb at output.

The auxiliary coder 14b comprises a quantizer 142b and a variable rate coding circuit 143b analogous to the circuits 142a and 143a shown in FIG. 2. The quantizer 142b receives at input a transformed digital error signal $z_b = Xb - Yb$ produced by the subtracter 13b. The quantizer 142b is followed by the variable rate coding circuit 143b which issues the digital error signal $e_a$ transmitted along the second path 32 of the network 3.

The detailed structure of the decoding device 2 matched to the coding device shown in FIG. 3, as is the case with the coding device shown in FIG. 2, can easily be deduced by those skilled in the art. The main decoder comprises a buffer memory circuit followed by a decoding circuit that complements the variable rate coding circuit 114b shown in FIG. 3 and by a predicting loop such as the predicting loop/decoder 12b shown in FIG. 3. The auxiliary decoder comprises a decoding circuit that complements the variable rate coding circuit 143b shown in FIG. 3, followed by a dequantizer. An inverse transform calculating circuit is provided at output of the summing integrator 23 (FIG. 1) in the decoding device 2.

What we claim is:

1. A method of coding and decoding a digital signal including picture information, comprising:

coding and rate decreasing an incoming digital video signal including picture information into a first coded digital signal having a variable rate at most equal to a maximal information rate and less than the rate of said incoming digital signal, transmitting said first coded digital signal in a first variable-rate transmission path of a digital transmission network, said rate decrease being a function of an instantaneous information rate dispatched by said first path, producing additional picture information in response to said instantaneous information rate in said first path being lower than said maximal information rate, said additional picture information being substantially deduced from a difference in picture information between said incoming digital signal and said first coded signal, coding said additional picture information into a second coded digital signal, transmitting said second coded digital signal in a second variable-rate transmission path of said network, decoding and rate increasing said first coded digital signal in said first path as a function of said instantaneous rate of said first path, thereby deriving a first decoded signal, decoding said second coded signal in said second path into a second decoded signal, and adding said first and second decoded signals into a recovered digital video signal substantially analogous to said incoming digital video signal.

2. The method claimed in claim 1, wherein said second coded digital signal has a constant rate lower than a predetermined minimum rate of said second variable rate path.

3. A coding device for an incoming digital video signal including picture information comprising:

first coding means for coding said incoming digital video signal into a first coded digital signal having a variable rate at most equal to a maximal information rate and less than the rate of said incoming digital signal, thereby transmitting said first coded digital signal in a first variable-rate transmission path of a digital transmission network, said first coded signal undergoing with respect of said incoming signal a rate decrease that is a function of an instantaneous information rate dispatched by said first path, means for estimating picture information included in said incoming digital video signal and effectively carried by said first coded signal thereby producing an estimated digital video signal, means responsive to said instantaneous information rate in said first path being lower than said maximal information rate for subtracting said estimated digital video signal from said incoming digital video signal into a digital video signal representative of additional picture information, second means for coding said additional picture information video signal into a second coded digital signal thereby transmitting said second coded signal in a second variable-rate transmission path of said network.

4. The coding device of claim 3, wherein said first coding means and said estimating means together comprise:

means for comparing a predicting video signal with said incoming digital signal for thereby deriving an error signal, first means for calculating a transformed error signal from said error signal according a predetermined transformation, means for quantizing said transformed error signal into a quantized error signal, means for variable bit rate coding said quantizing error signal into said first coded digital signal, means reciprocal to said quantizing means for dequantizing said quantized error signal into a dequantized error signal, second means reciprocal to said first calculating means for calculating a second error signal from said dequantized error signal according to a transformation inverse of said predetermined transformation, means for adding said second error signal and said predicting video signal into said estimated signal, picture movement compensating means for receiving said incoming digital signal, and means for predicting said incoming digital video signal as a function of said estimated signal and of signals supplied from said compensating means, thereby producing said predicting video signal.

5. The coding device of claim 4, wherein said second coding means comprises:

means for calculating an additional transformed error signal from said additional picture information video signal according to a second predetermined transformation, means for quantizing said additional transformed error signal into an additional quantized error signal, and means for variable bit rate coding said additional quantized error signal into said second coded digital signal.

6. The coding device claimed in claim 3, wherein said second coding means comprises means for quantizing said additional picture information video error signal into a quantized error signal, and means for variable bit rate coding said quantized error signal into said second coded digital signal.

7. The coding device claimed in claim 3, wherein said first coding means and said estimating means make up a coder of the predicting loop type.

8. The coding device claimed in claim 3, further comprising input means for calculating a transformed digital video signal from said incoming digital video signal according to a predetermined picture transformation, said transformed digital video signal being supplied to a common input of said first coding means and said subtracting means.

9. The coding device claimed in claim 4, wherein said predetermined transformation is a corsine transformation.

10. The coding device claimed in claim 5, wherein said second predetermined transformation is a transformation of the PCM or DPCM type.

* * * * *